No. 615,755. Patented Dec. 13, 1898.
C. SCHNEIDER.
ENGRAVING AND RULING MACHINE.
(Application filed July 30, 1895. Renewed May 20, 1898.)
(No Model.) 7 Sheets—Sheet 1.

No. 615,755. Patented Dec. 13, 1898.
C. SCHNEIDER.
ENGRAVING AND RULING MACHINE.
(Application filed July 30, 1895. Renewed May 20, 1898.)
(No Model.)
7 Sheets—Sheet 3.

WITNESSES:

INVENTOR
Carl Schneider
BY Henry Schreiter
his ATTORNEY

THE NORRIS PETERS CO., PHOTO-LITHO., WASHINGTON, D. C.

No. 615,755. Patented Dec. 13, 1898.
C. SCHNEIDER.
ENGRAVING AND RULING MACHINE.
(Application filed July 30, 1895. Renewed May 20, 1898.)
(No Model.) 7 Sheets—Sheet 4.

No. 615,755. Patented Dec. 13, 1898.
C. SCHNEIDER.
ENGRAVING AND RULING MACHINE.
(Application filed July 30, 1895. Renewed May 20, 1898.)
(No Model.) 7 Sheets—Sheet 5.

WITNESSES:
D. Petri-Palmedo
Maurice Tanzer.

INVENTOR
Carl Schneider
BY Henry Schreiter
his ATTORNEY.

No. 615,755. Patented Dec. 13, 1898.
C. SCHNEIDER.
ENGRAVING AND RULING MACHINE.
(Application filed July 30, 1895. Renewed May 20, 1898.)
(No Model.) 7 Sheets—Sheet 7.

WITNESSES:
Carl Schneider, INVENTOR
BY Henry Schreiter
his ATTORNEY.

THE NORRIS PETERS CO., PHOTO-LITHO., WASHINGTON, D. C.

UNITED STATES PATENT OFFICE.

CARL SCHNEIDER, OF NEW YORK, N. Y.

ENGRAVING AND RULING MACHINE.

SPECIFICATION forming part of Letters Patent No. 615,755, dated December 13, 1898.

Application filed July 30, 1895. Renewed May 20, 1898. Serial No. 681,200. (No model.)

*To all whom it may concern:*

Be it known that I, CARL SCHNEIDER, a citizen of the United States, and a resident of New York, (Brooklyn,) county of Kings, and State of New York, have invented certain new and useful Improvements in Engraving and Ruling Machines, of which the following is a clear, full, and exact specification.

My invention relates to engraving and ruling machines; and it consists in the construction of several new parts and in combinations of these parts in the construction of my improved machine for engraving and ruling parallel strias upon the surface of lithographic stone, steel, copper, or zinc plates for printing of shaded surfaces, or upon glass used in production of half-tone engravings, and for all such or similar purposes requiring a very minute division of the engraved lines and utmost exactness in execution of the plates. The engraving of such plates by methods and contrivances used heretofore is tedious, slow, and expensive, requiring constant attendance of skilled workers at the machines, owing to insufficiency of the feeding mechanism and to utter absence of mechanism for automatic stopping and reversing within variable limits of the motions of the tool-carriage. With the end in view to improve upon the devices heretofore known and used in the trade I constructed the hereinafter-described engraving and ruling machine that feeds the tool-support automatically, speed and length of the feeding motion and also the length of the travel of the carriage being adjustable. It is provided with mechanism for automatically stopping and reversing the run of the tool-carriage within adjustable limits, with mechanism for automatically lifting the tool from the plate on the return trip, and with a tool-holder permitting vertical adjustment of the graver without affecting the position of its cutting edge in relation to the plate. My improved engraving and ruling machine when once properly set does not require any attendance whatever until the work is finished. The strias produced by it are exactly parallel and accurately divided.

In the accompanying drawings, Figure 1 is a top view, and Fig. 2 a side elevation, of my improved engraving and ruling machine. Fig. 3 is a top view, Fig. 4 a section on line 4 4, indicated in Fig. 3, and Fig. 5 a front elevation, of the tool-support, showing also the tool-post and the tool-holder with the graver secured thereto. Fig. 6 is a top view, and Fig. 7 a front elevation, of the feeding mechanism. Fig. 8 is a horizontal section of the same on line 8 8, indicated in Fig. 9. Fig. 9 is a vertical section on line 9 9, indicated in Fig. 8. Fig. 10 is an elevation of a part of index-dial with setter, the front part of the setter being removed. Fig. 11 is a perspective view of the double-ended pawl used in the feeding mechanism. Fig. 14 is a top view, and Fig. 15 a side view, of details of the reversing mechanism, drawn on an enlarged scale.

Similar letters of reference indicate corresponding parts in all drawings and also corresponding parts in the modified constructions.

The machine is mounted upon a horizontal bench serving as a bed for the plates to be ruled or engraved. The frame of the machine consists of standards A and A' and bars B and B', set edgewise upon the standards and secured in their bearings by lids *a'*. These bars are rectangular in section and form slideways for the tool-carriage. This carriage consists of cross-beams C and of head-piece C'. This latter is provided with a Λ-shaped groove extending its whole length and is fitted upon the slideway B. One end of cross-beam C is secured to head-piece C', and its other end rests upon bar B', forming a bridge across the frame, and a guide or slideway for the tool-support being fitted into the dovetailed groove of support-plate D. Feed-screw $b$, revolving between centers $b'$ and $b^2$, passes through a bearing provided for it on top of head-piece C' into a stationary flanged sleeve $bs$, secured to head-piece C' by screws $s^5$. On this sleeve and partly also on the projecting end of the feed-screw is arranged in the frame, composed of bars $d$ and $d'$, screwed into the head-piece C' and connected by tie $e$, the automatic feed mechanism, together with mechanism for operating the elbow-lever frame F, lifting and lowering frames E' of the tool-support.

Figures 3, 4, 5:
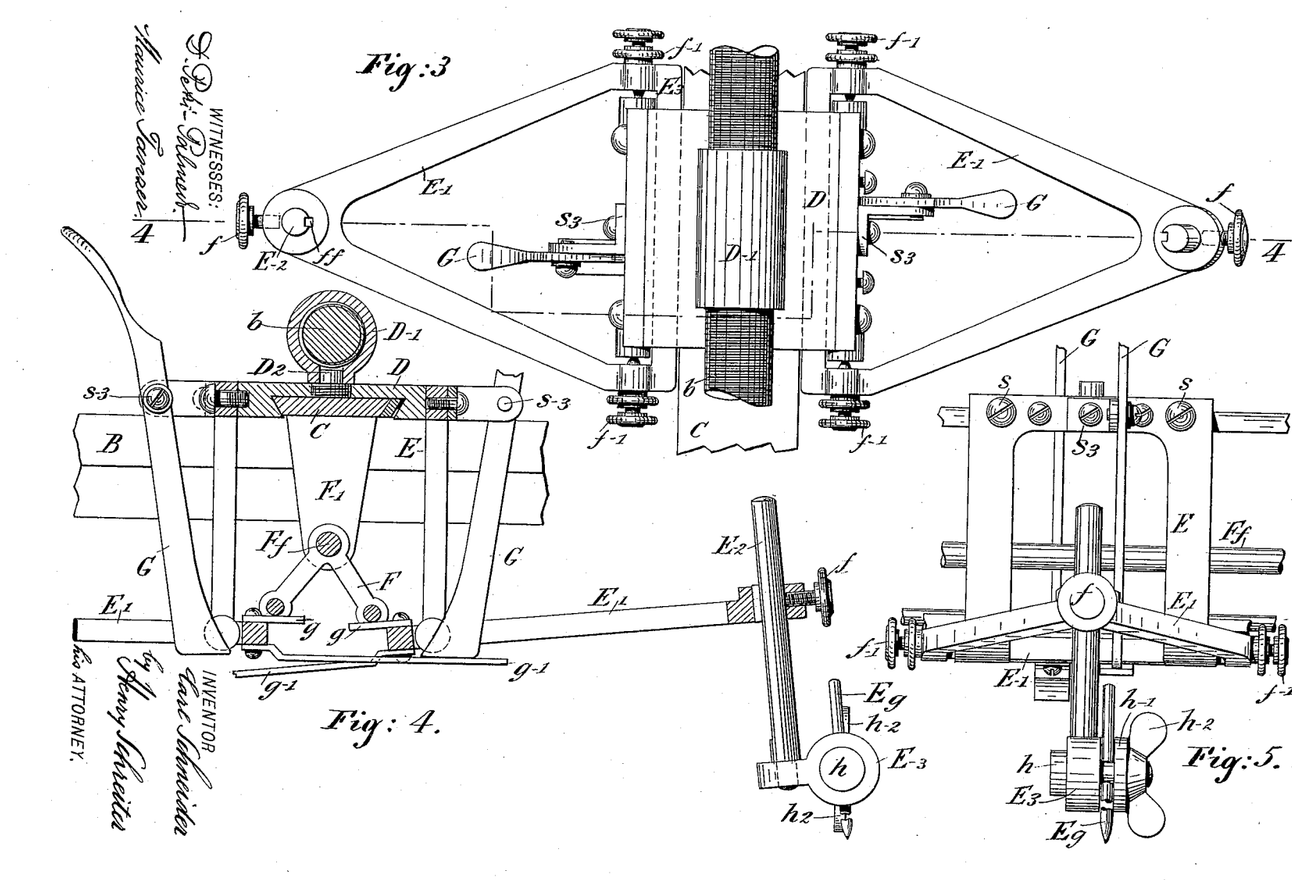

The tool-support comprises plate D, with screw-threaded sleeve D', set on trunnion $D^2$, screwed into the plate D, as shown in Fig. 4, stationary frames E, secured by screws $s$, one to each side of plate D, and triangular swinging frames E', hinged to frames E and carrying tool-posts $E^2$, adjustably secured thereto. Plate D, provided with a dovetailed groove, is fitted snugly on cross-beam C and slides on it transversely between the slideways B B', fed by screw $b$, passing through sleeve D' and moving it as it revolves. Tool-post $E^2$ is adjustably secured by set-screw $f$ in the head of the triangular frame E', hinged to frame E, and swings between centers of set-screws $f'$. The machine works both ways and two plates may be engraved simultaneously, the tool-frames being lifted and lowered alternately and each graver working in one direction as the carriage passes over the plate or stone to be engraved.

Short levers $g$, screwed to the base of swinging frame E', rest against the elbow-lever frame F, oscillating on shaft $Ff$, between hangers F'. Wiper W, set on shaft $Ff$, rocks the swinging frames E', whereby the gravers E$g$ are lifted and lowered as the position of the elbow-lever frame F changes. The mechanism performing and governing the oscillating motion of this elbow-lever frame F is so timed that each of the two gravers E$g$ will be lifted when the carriage passes in opposite direction of its edge and again lowered when the motion of the carriage is reversed.

Long levers $g'$, screwed to the base of the swinging frame E', rest against thumb-levers G, pivoted on brackets $s^3$, attached to frame E, and, together with thumb-levers G, serve to lift the gravers as may be needed in setting the machine or for suspending temporarily the operation of one or both of the graving-tools.

Tool-post $E^2$ is set in the head of the swinging frame E' and is provided with a rectangular groove extending its whole length. A corresponding key $ff$ is set in the boring to prevent the turning of the tool-post. Tool-post $E^2$ is vertically adjustable and is held in position by set-screw $f$. Tool-holder $E^3$ is rigidly screwed to the lower end of tool-post $E^2$. Graver E $g$ is set in a hole bored transversely through screw $h$ and is held between the holder $E^3$ and washer $h'$ by thumb-screw $h^2$. The point of the graver is provided with a diamond bit, set in it in the usual manner.

Figures 1, 14, 15:
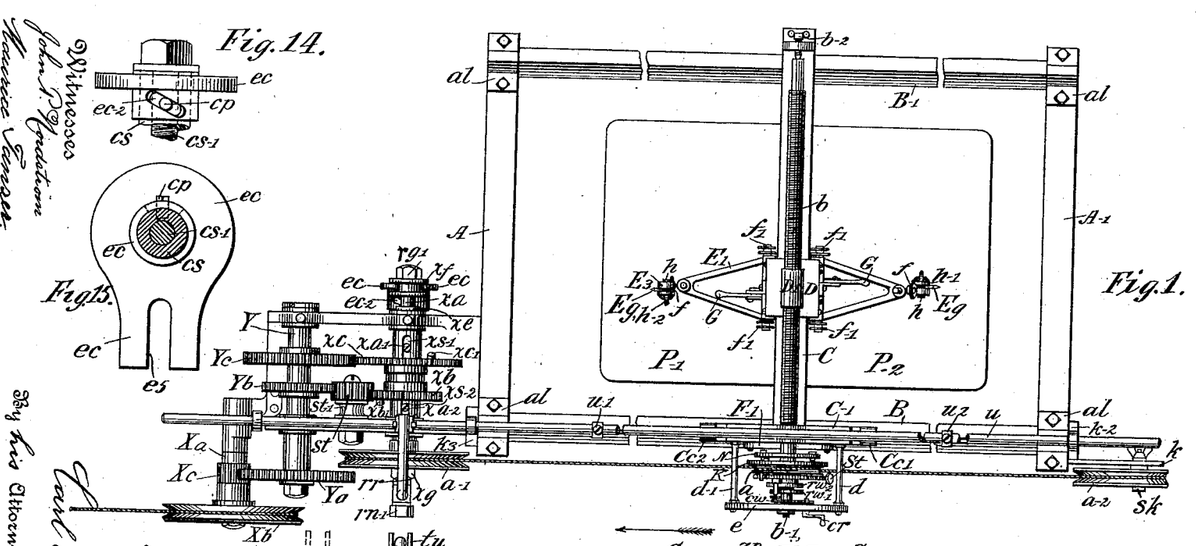

The tool-carriage is moved on slideways B and B' by means of an endless rope wound upon grooved pulley $a$ and stretched over grooved pulleys $a'$ and $a^2$. Pulley $a^2$ rotates on stud $sk$, secured in slot $k'$ of bracket $k$, screwed to standard A'. Stud $sk$ may be adjusted in slot $k'$ to compensate for extension or contraction of the endless rope $l$. Grooved pulley $a'$ imparts the motion to the rope. This pulley is set on shaft $xe$ of the counter-shaft, where also the motion-reversing mechanism is arranged in the following manner: The counter-shaft is composed of main shaft $Xa$, with rope-pulley $Xb$ and pinion $Xc$, of the transmitting-shaft Y, with cog-wheels $Ya$, $Yb$, and $Yc$, and of driving-shaft $xe$, with driving rope-pulley $a'$ and cog-wheels $xb$ and $xc$. Between cog-wheels $Yb$ and $xb$ is set on stud $st'$ idle-wheel $st$. Cog-wheels $xb$ and $xc$ run loose on bushing $xd$ and are provided with pins $xb'$ and $xc'$. Rope-pulley $a'$ is set on hollow shaft $xe$ and is held in position by screw-nut $xg$. In this shaft slides longitudinally spindle $xa$, with collar $xf$ secured to it by screw-nut $rg'$, and pins $xa'$ and $xa^2$ screwed therein and projecting through slots $xs'$ and $xs^2$. Cam $ec$, oscillating on hollow stud $cs$, secured to standards $ip$ by screw $cs'$, engages grooved collar $xf$. The hub of this cam $ec$ is elongated, forming a sleeve upon stud $cs$, and is provided with a spiral slot $ec^2$. Through this slot $ec^2$ projects pin $cp$, screwed in stud $cs$. This is shown in detail in Figs. 14 and 15. Cam $ec$ is moved by crank-pin $rn$, passing through slot $es$ and screwed in crank $rc$, secured by screw-nut $ro'$ to oscillating shaft $ro$. On the other end of oscillating shaft $ro$ and adjustably secured thereto by set-screw $ge$ and screw-nut $rn'$ is set the rocking rod $rr$, engaged by fork $tu$, attached to sliding rod $u$ of the machine.

Figure 2:
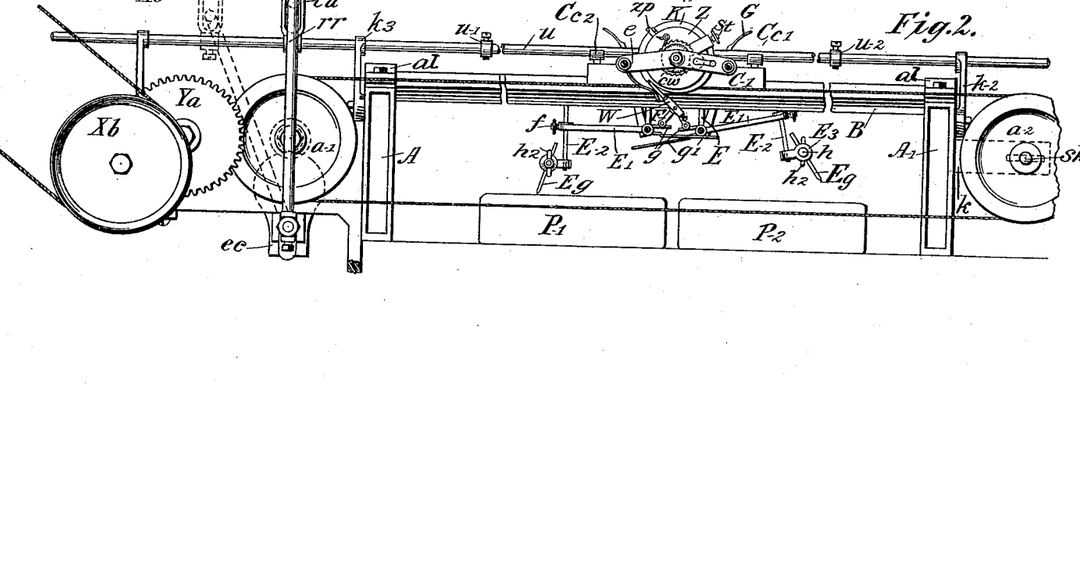

It will be observed from the arrangement of the cog-wheels on shafts Y and $xe$, together with the intermediate wheel $st$, that cog-wheels $xb$ and $xc$ revolve in opposite directions, and that according to the position of the spindle $xa$ either wheel $xb$ will engage pin $xa^2$ or wheel $xc$ the pin $xa'$, and consequently rope-pulley $a'$ will rotate either in the direction of wheel $xb$ or $xc$. The position of the spindle $xa$, and consequently also of pins $xa'$ and $xa^2$, is governed by the position of the cam $ec$ on stud $cs$. Guided by pin $cp$, set in spiral slot $ec^2$, cam $ec$ will change its position between standard $ip$ and washer $ws$, according to how rocking rod $rr$ moves. In accordance with the movement of the cam $ec$ spindle $xa$ will slide inward and outward, and with it pins $xa'$ and $xa^2$, catching alternately pins $xb'$ and $xc'$, and consequently the rotation of rope-pulley $a'$ will change with the change in position of rocking shaft $rr$. On this sliding rod $u$ are set the stop-collars $u'$ and $u^2$, limiting the travel of the tool-carriage. Stoppers $Cc'$ and $Cc^2$, screwed in the head-piece $C'$, abut against collars $u'$ and $u^2$ and push sliding rod $u$ in the direction as the tool-carriage travels. In the position illustrated in Figs. 1 and 2 the carriage travels in the direction toward the counter-shaft, as indicated by the arrow set between those two figures, and when the stopper $Cc^2$ of the tool-carriage reaches collar $u'$ the sliding rod $u$ will be moved in the same direction. This movement of the sliding rod $u$ is imparted through fork $tu$ to rocking rod $rr$, and thereby to the rotation of driving rope-pulley $a'$ is changed.

Figure 16:
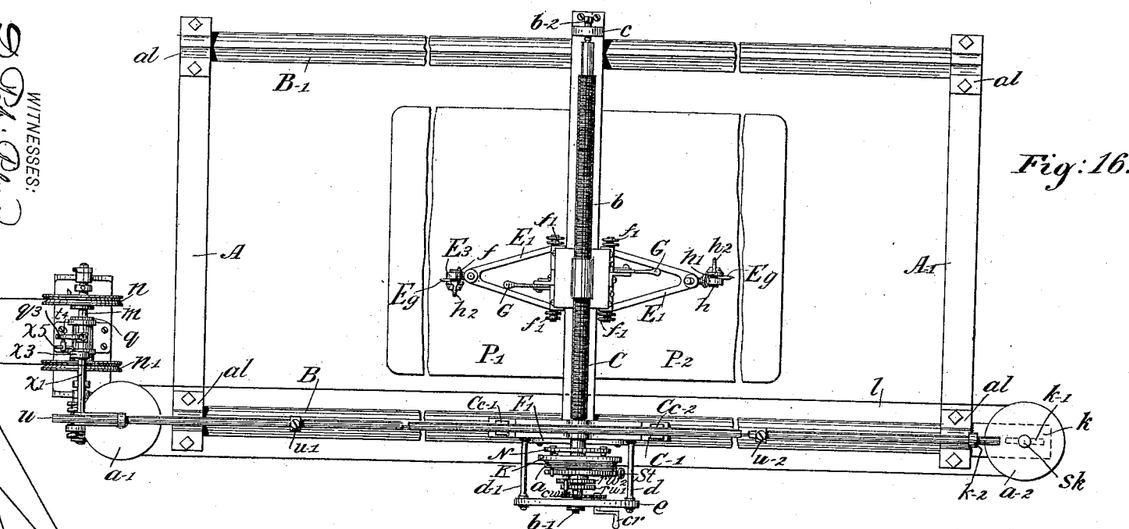
Fig. 16 is a top view, and Fig. 17 a side elevation, of my improved engraving and ruling machine, showing a different arrangement of the counter-shaft and of the driving mechanism.
Figure 17:
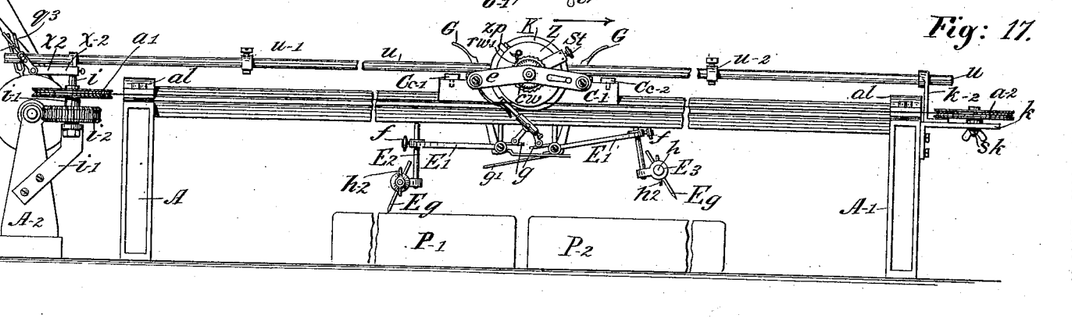
Figure 18:
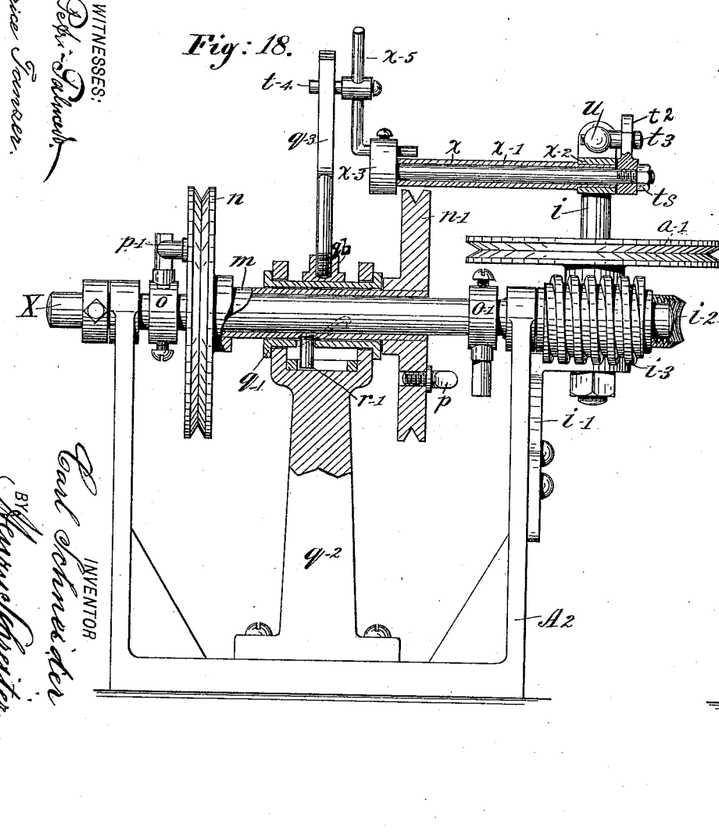
Fig. 18 is a front elevation of the counter-shaft, shown in connection with the machine in Figs. 16 and 17, some parts of the reversing mechanism being shown in section.
Figure 19:
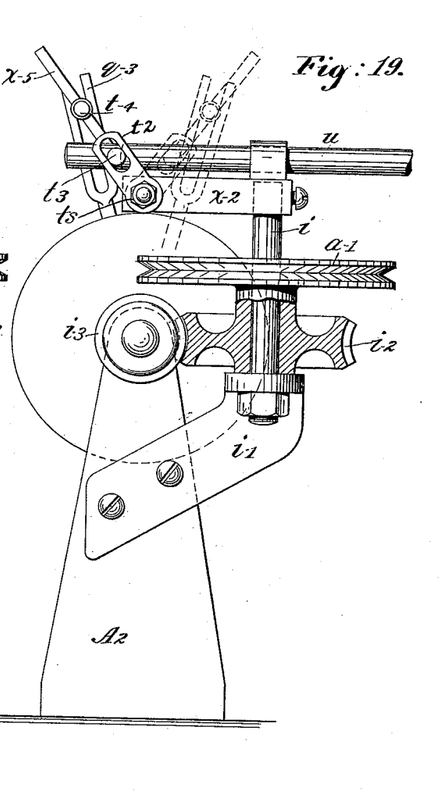
Fig. 19 is a side elevation of the same, the worm-wheel being shown in section.

In Figs. 16, 17, 18, and 19 I have shown a somewhat different construction of the counter-shaft and of the motion-reversing mechanism. Figs. 16 and 17 illustrate this counter-shaft in connection with the machine, and Figs. 18 and 19 give the details of it on an enlarged scale. In this arrangement rope-pulley $a'$ is set on stationary spindle $i$, set in bracket $i'$, secured to the standard $A^2$ of the counter-shaft, and is joined to worm-wheel driven by worm $i^3$, set on shaft X. Rope-wheels $n$ and $n'$, driving the shaft X, rotate loosely on sleeve $m$ in opposite directions. They are both driven from the same shaft, one with a straight and the other with a crossed belt. Sleeve $m$ slides on shaft X, between the dogs $o$ and $o'$, rigidly secured to the shaft X and sufficiently apart that pins $p$ and $p'$, set in rope-wheels $n$ and $n'$, respectively, will pass clear of both when sleeve $m$ is held equidistantly from both. On the sleeve $m$ is slid another sleeve $q'$, held in stationary position relatively to shaft X by standard $q^2$. This sleeve $q'$ is provided with a spiral slot, (indicated in dotted lines in Fig. 18,) and pin $r'$, screwed in sleeve $m$, slides in this spiral slot when the sleeve $q'$ is turned, and moves thereby the sleeve $m$ and the rope-wheels $n$ and $n'$, rotating thereon, to and fro between the dogs $o$ and $o'$ accordingly. This turning motion of the sleeve $q'$ is produced by forked lever $q^3$, screwed in boss $qb$, provided on top of sleeve $q'$. Forked lever $q^3$ is actuated by pin $t^4$, secured adjustably to crank-pin $x^5$, which in turn is adjustably secured in collar $x^3$, set on the end of shaft $x$. This shaft $x$ oscillates in sleeve $x'$, rigidly secured in bracket $x^2$, supported on spindle $i$. Eyepiece $t^2$, secured to shaft $x$ by screw-nut $ts$ is engaged by pin $t^3$, screwed in sliding rod $u$, and thus shaft $x$, and consequently also forked lever $q^3$, are actuated by this sliding rod $u$. Sleeve $q'$ cannot, as already stated above, change its position in relation to the shaft X, and therefore when turning forces pin $r'$ to move along the spiral slot, and as pin $r'$ is screwed to sleeve $m$ this sleeve and the rope-pulleys $n$ and $n'$, rotating thereon, are thereby shifted on shaft $x$.

In Fig. 18 I have shown the counter-shaft in such position where the pin $p'$ of the rope-wheel $n$ engages the dog $o$. This position indicates the motion of the tool-carriage toward the other end of the machine, as also indicated by arrow in Fig. 17. When the carriage proceeded so far that stop $Cc^2$ abuts against stop-collar $u^2$, the sliding rod $u$ will be pushed by the carriage in the direction of the arrow. Pin $t^3$ will then throw eyepiece $t^2$, pin $t^4$, and lever $q^3$ in the position indicated in dotted lines in Fig. 19. Sleeve $q'$ will be thereby turned in the same direction, and pin $r'$, gliding along in the spiral slot, will shift the sleeve $m$ and the rope-wheels $n$ and $n'$, rotating thereon, in the direction of dog $o'$. Pin $p'$ will thus be disengaged from dog $o$, and pin $p$, set in rope-wheel $n'$, will in turn engage dog $o'$, reversing thereby the motion of the shaft X, and consequently also the worm-wheel $i^3$, rope-pulley $a'$, and also of the tool-carriage.

Figures 20, 21:
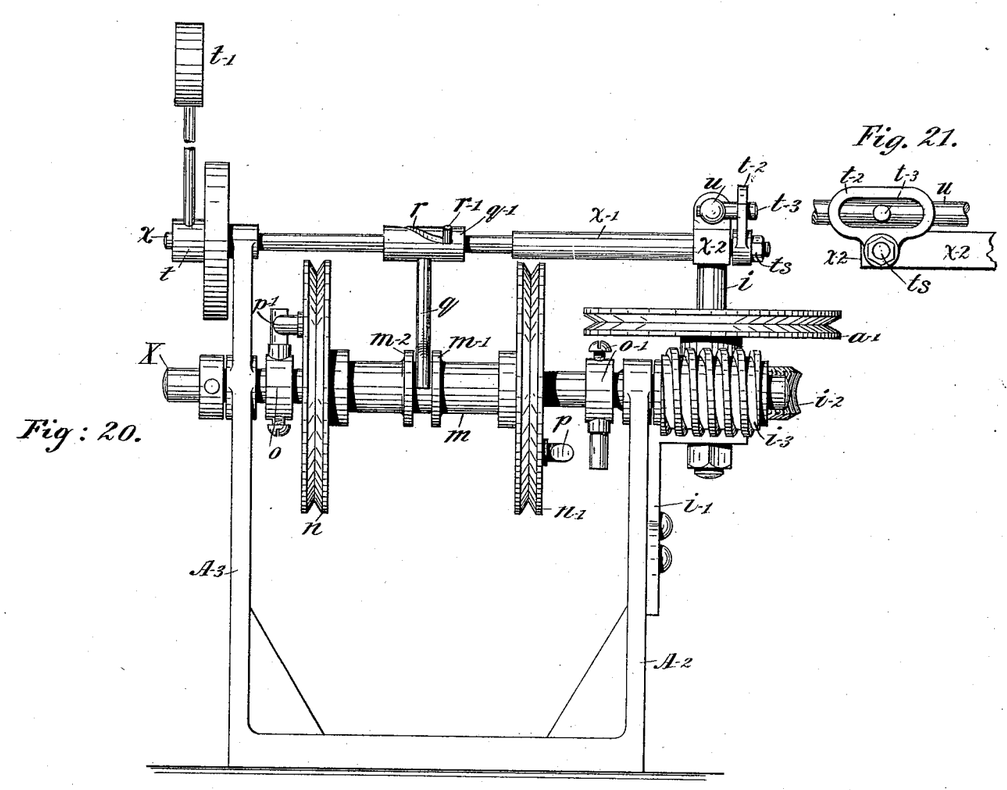
Fig. 20 is a front elevation of a counter-shaft similar to that shown in Figs. 18 and 19, but with a modification of the motion-reversing mechanism.
Fig. 21 is a detail side view of the arrangement shown in Fig. 20.

The modified construction of the counter-shaft shown in Figs. 20 and 21 is based on the same principle and differs from that shown in Figs. 18 and 19 only in the arrangement of the operating parts. In this construction sleeve $m$ is moved between dogs $o$ and $o'$ by pin $q$, screwed in collar $q'$, set loosely on the oscillating shaft $x$ and shifted thereon by pin $r'$, screwed in the oscillating shaft $x$ and sliding in spiral slot $r$ when shaft $x$ is turned. Pin $q$ reaches between collars $m'$ and $n^2$ and shifts sleeve $m$ and the pulleys $n$ and $n'$, thereby reversing the motion of the shaft X correspondingly with the motions of sleeve $q'$ on shaft $x$ and in a manner similar to that described above. Shaft $x$ is pillowed in standard $A^3$ and in stationary sleeve $x'$, secured in bracket $x^2$, screwed to the stationary spindle $i$. On the end projecting beyond the bearing in the standard $A^3$ is set in the collar $t$ the weighted lever $t'$, having the function to complete the turning motion of the shaft $x$, started by the impulse given by sliding rod $u$. On the other end of the shaft $x$, also beyond the bearing in bracket $x^2$, is secured the eyepiece $t^2$ by screw-nut $ts$. Pin $t^3$, screwed in sliding rod $u$, guiding in a bearing provided in the enlarged head of the stationary spindle $i$, engages in the eyepiece $t^2$ and turns the shaft $x$ accordingly as the sliding rod $u$ is pushed by the moving tool-carriage.

Figures 6, 7, 8, 9, 10, 11:
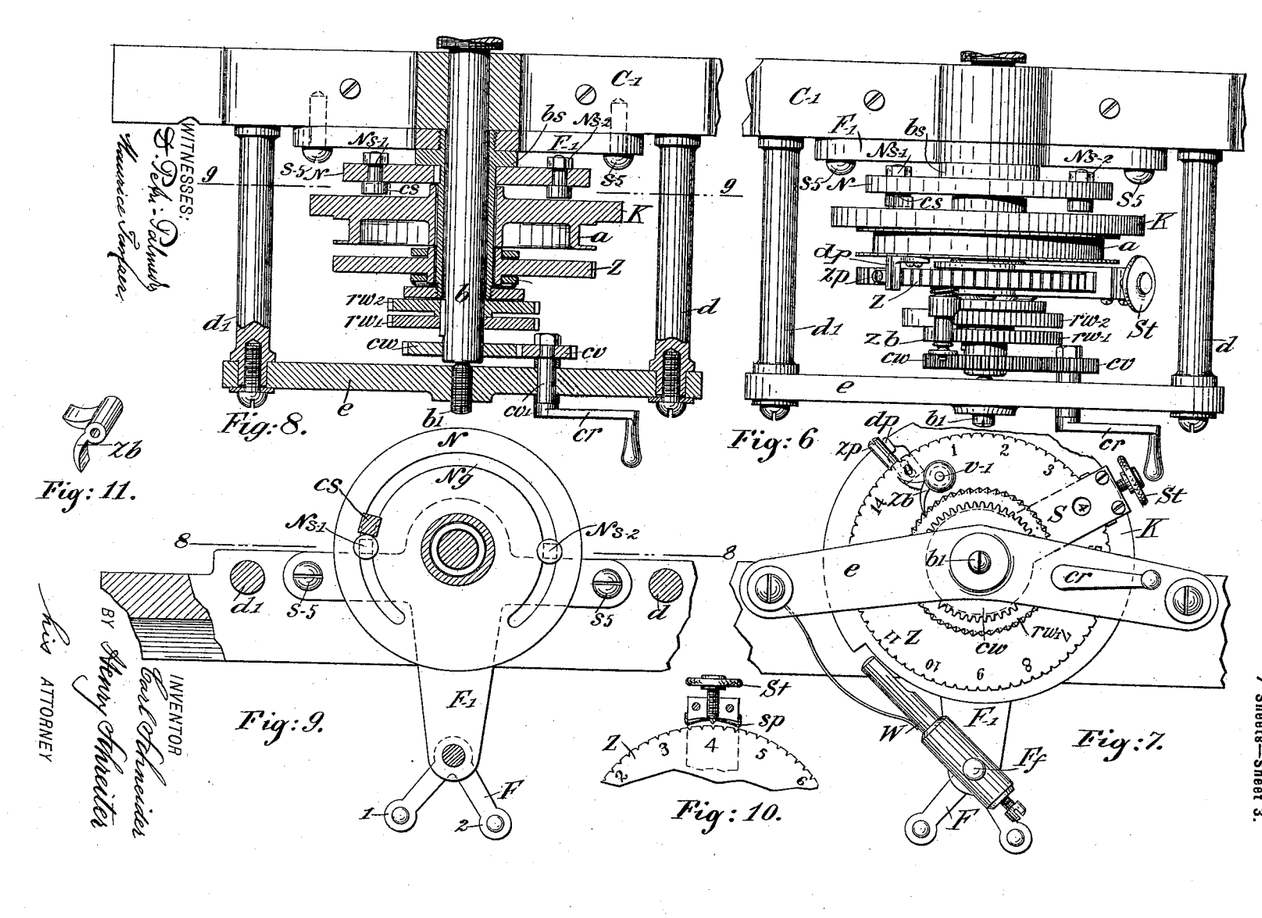
Figure 12:
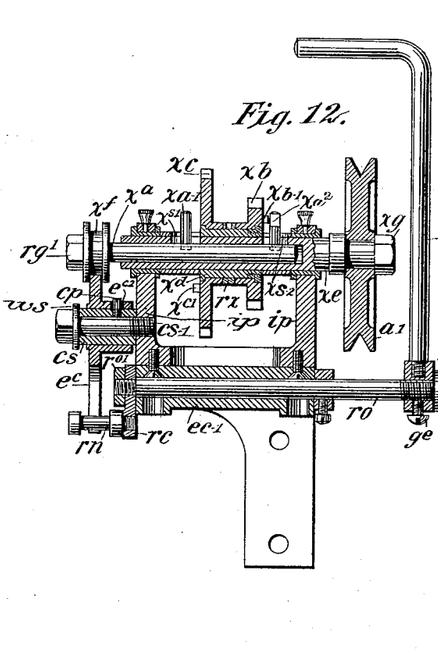
Fig. 12 is a vertical section of the reversible counter-shaft shown in top view in Fig. 1, showing the arrangement of the driving-shaft and of the reversing mechanism.
Figure 13:
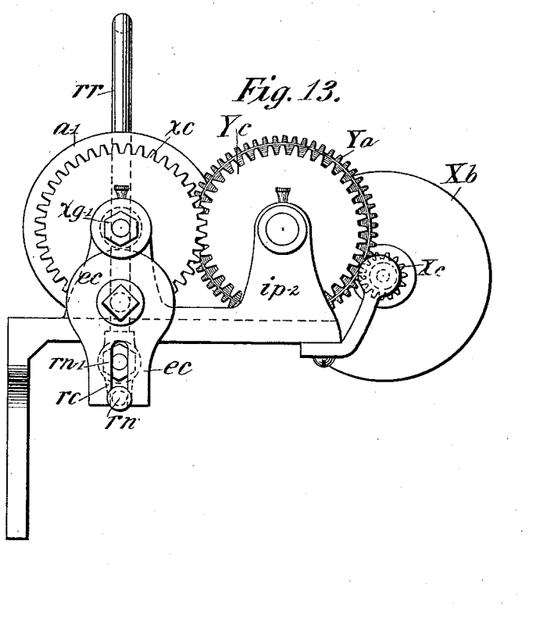
Fig. 13 is a side elevation of the same.

For adjusting the support and setting the graver to the starting-point of the work, or for similar purposes when the machine is not running, is set cog-wheel $cw$ on the screw-shaft $b$, nearest to its end and rigidly keyed to it. Pinion $cv$, driving cog-wheel $cw$, is set on stud $cv'$, journaled in the tie $e$, and rotated by crank-handle $cr$. Beyond this cog-gear are set closely together, and also rigidly secured to the screw, ratchet-wheels $rw'$ and $rw^2$, having teeth turned in opposite directions. A double-end pawl $zb$, set on pin $v'$, secured in index-disk Z, engages one of these ratchet-wheels and moves it according to how the feed mechanism is set. Index-wheel Z is set on stationary sleeve $bs$, adjoining ratchet-wheels $rw'$ and $rw^2$, and is divided on its circumference correspondingly with the pitch of the screw. Numbers engraved on its face designate in degrees or units of length the speed of the motion of the feed-screw. Setter S swings around index-disk Z and is held in adjusted position by screw S$t$. In the head of the setter (shown in Fig. 10) a sharp edge attached to spring $sp$ and fitting in corresponding V-shaped grooves on the circumference of the index-disk Z is provided. Screw S$t$ presses this edge in the groove of the index, thus fastening it securely in desired position. A circular opening on the face of setter S is for adjustment of the feed mechanism exactly in such position as the desired speed requires, the corresponding number on the face of the index-disk Z, indicating the speed, appearing through the opening when the setter is set in right position. Stationary pin $zp$ is screwed in the circumference of index-wheel Z exactly in the zero-point of the dial. Pin $dp$, screwed or otherwise fastened on the face of rope-wheel $a$, engages alternately pin $zp$ and setter S, thereby imparting to index-disk Z the rotary motion of the rope-wheel $a$. Pawl $zb$, moving with the index-disk Z, engages, according to its position, one of the ratchet-wheels, ($rw'$ or $rw^2$,) thereby turning the feed-screw $b$ on the one end of the carriage travel and is drawn back over the ratchet-wheel when the motion of the carriage is reversed on the other end. Though the machine works with two gravers, each graver cutting in one direction while the other is held suspended above the engraved plate, the feed-screw $b$ is turned always only on one end of the carriage travel, and this action is changed from one end to the other with the change of the transverse motion of the tool-carriage. In the case illustrated in the drawings, Figs. 1 and 2, the carriage is fed from the head-piece C' to the end of the cross-beam C, and the turning of the feed-screw $b$ is done when the carriage reaches the limit of its travel by stopper $u^2$, pawl $zb$ engaging the ratchet-wheel $rw'$ and the index-disk Z moving with the rope-wheel $a$ from right to left. To reverse the feed of the tool-carriage, it is only necessary to throw over the pawl $zb$. Then its other end will engage ratchet-wheel $rw^2$, having teeth in opposite direction, and the turning of the feed-screw will be done in the same manner on the other end, (when the tool-carriage reaches stop-collar $u'$,) where the rope-wheel $a$ and the index-disk Z turn in opposite direction—from left to right.

The speed of the feed is adjusted by setting setter S nearer to or farther from zero-pin $zp$. Pin $dp$ travels at the start of each trip of the tool-carriage between the zero-pin $zp$ and setter S, and consequently does not move the index-disk Z in either way while passing from pin $zp$ to setter S, or vice versa. The speed of the feed will therefore depend on the position of the setter S in relation of the zero-pin $zp$. The extent of the rotary motion of the rope-pulley $a$ is limited by the position of stop-screws N$s'$ and N$s^2$, set in circular slot N$g$ of the disk N, rigidly keyed to the stationary sleeve $bs$, on which rope-wheel $a$ and cam K and also the index-disk Z rotate and wherein the feed-screw $b$ is pillowed. When the carriage reaches one end of its travel and the motion of the counter-shaft is reversed, then rope $l$, running around the rope-wheel $a$, will turn it in the direction of the return run (also on the stop by collar $u^2$ from right to left and in opposite direction when the tool-carriage reaches stop-collar $u'$) until pin $cs$, screwed in the cam K and traveling in the circular slot N$g$ of the disk N, will strike against the stop-bolt N$s'$ or N$s^2$, as the case may be, whereupon the rotary motion of the rope-wheel $a$ will be stopped and also the motion of the rope $l$ around the rope-wheel $a$. The stopping of the rotary motion of rope-wheel $a$ is absolute, and as the friction of the endless rope around the wheel $a$ is infinitely greater than the axial friction of rope-wheels $a'$ and $a^2$ and the resistance of the carriage and of the tool comparatively small the tool-carriage will be then drawn on slideways B and B' by the endless rope $l$, running over rope-pulleys $a'$ and $a^2$.

Rope-pulley $a$ is screwed to or cast in one piece with eccentric cam K, pressing against wiper W, set adjustably on the projecting end of shaft F$f$, carrying elbow-lever frame F, rigidly keyed to it. Eccentric cam K revolves together with pulley $a$ on the start and on the end of the travel of the carriage, and wiper W, yielding as it revolves, causes frame F to swing in corresponding direction. Rods 1 and 2 press upon strips $g$ $g'$, and when frame F swings rod 1 or 2 lifts the corresponding swinging frame E', carrying the graver, and the other frame, E', will at the same time be lowered. This alternate lifting and lowering of the graver-frames occur at each stop and reversing of the motion of the tool-carriage.

In this specification I have described several varying modes of arrangement and combination of the parts. It is apparent that besides the described variations in the construction of my improved engraving and ruling machine the parts comprising my invention may be variously combined and differently arranged for the same or for other similar purposes, and Therefore I claim and desire to secure by Letters Patent—

1. In an engraving and ruling machine, having a frame composed of two horizontal slideways, pillowed on standards, a tool-carriage, forming a bridge across the frame and sliding longitudinally upon the horizontal slideways, a tool-support with swinging frames, hinged thereto and carrying tool-posts, the support being adapted to slide on the carriage and to be fed automatically forward and backward, transversely between the slideways, by a revolving screw passing through a screw-thread dead-sleeve set on a trunnion secured to the support, the combination with the feed-screw, of mechanism for automatically revolving the same at variable speed and comprising a pin, set in the driving-wheel, and index-wheel with stationary pin set in its circumference, an adjustable setter swinging around the index-wheel, and adapted to be secured to it by a set-screw, a double-end pawl, swinging on a pin, screwed in the index-wheel, and two ratchet-wheels, set with teeth opposite each other, this mechanism being arranged on the shaft of the feed-screw and operating as described in this specification.

2. In an engraving and ruling machine, having a frame composed of two horizontal slideways, pillowed on standards, a tool-carriage forming a bridge across the frame and sliding longitudinally upon the horizontal slideways, a tool-support sliding on the carriage, the combination with the support, having swinging frames hinged thereto and carrying tool posts and strips screwed to the base of the swinging frames, of an elbow-lever frame swinging on a shaft and having a wiper set on the projecting end of the oscillating shaft, and of an eccentric cam, set on the shaft of the feed-screw, and pressing against the wiper, moving the elbow-lever frame as it revolves, whereby the swinging frames of the support, carrying the tool-posts are alternately lifted and lowered concurrently with the stopping and reversing of the motion of the tool-carriage.

3. The combination, with an engraving and ruling machine, having a frame composed of two horizontal slideways pillowed on standards, a tool-carriage, sliding longitudinally on the horizontal slideways, a tool-support with swinging frames carrying the tool-post, sliding on the carriage and fed forward and backward by a feed-screw, mechanism for moving the carriage upon the horizontal slideways, mechanism for automatically feeding the tool-support at variable speed, and for alternately lifting and lowering the support-frames, of a counter-shaft, comprising a hollow shaft with a driving-wheel, secured thereto, and a spindle sliding in the shaft, having pins, secured thereto and projecting through slots provided in the shaft, two driving-wheels, set on the shaft and revolving loosely in opposite directions and having pins secured thereto, adapted to engage the pins screwed in the sliding spindle, an eccentric cam with a slotted arm, set on a stud underneath the shaft and having its hub elongated to form a sleeve; a spiral slot provided in the sleeve, a guide-pin screwed in the stud through the spiral slot, an oscillating shaft, journaled underneath the stud, a crank, set on the oscillating shaft, and engaged in the slotted arm of the eccentric cam, a rocking rod secured to the oscillating shaft, and a flanged collar, set on the spindle sliding in the hollow shaft, the eccentric cam engaging the flanged collar, and shifting the spindle in the shaft, accordingly, as the oscillating shaft, with the crank, operating the eccentric cam, is moved by the rocking rod attached to it.

In witness that I claim the improvements described in the foregoing specification I have signed my name in the presence of two subscribing witnesses.

CARL SCHNEIDER.

Witnesses:
MAURICE TANZER,
JOHN P. NORDSTROM.